Sept. 2, 1941.   E. CLEVELAND   2,254,420
REFRIGERATING APPARATUS
Filed Jan. 24, 1939   3 Sheets-Sheet 1
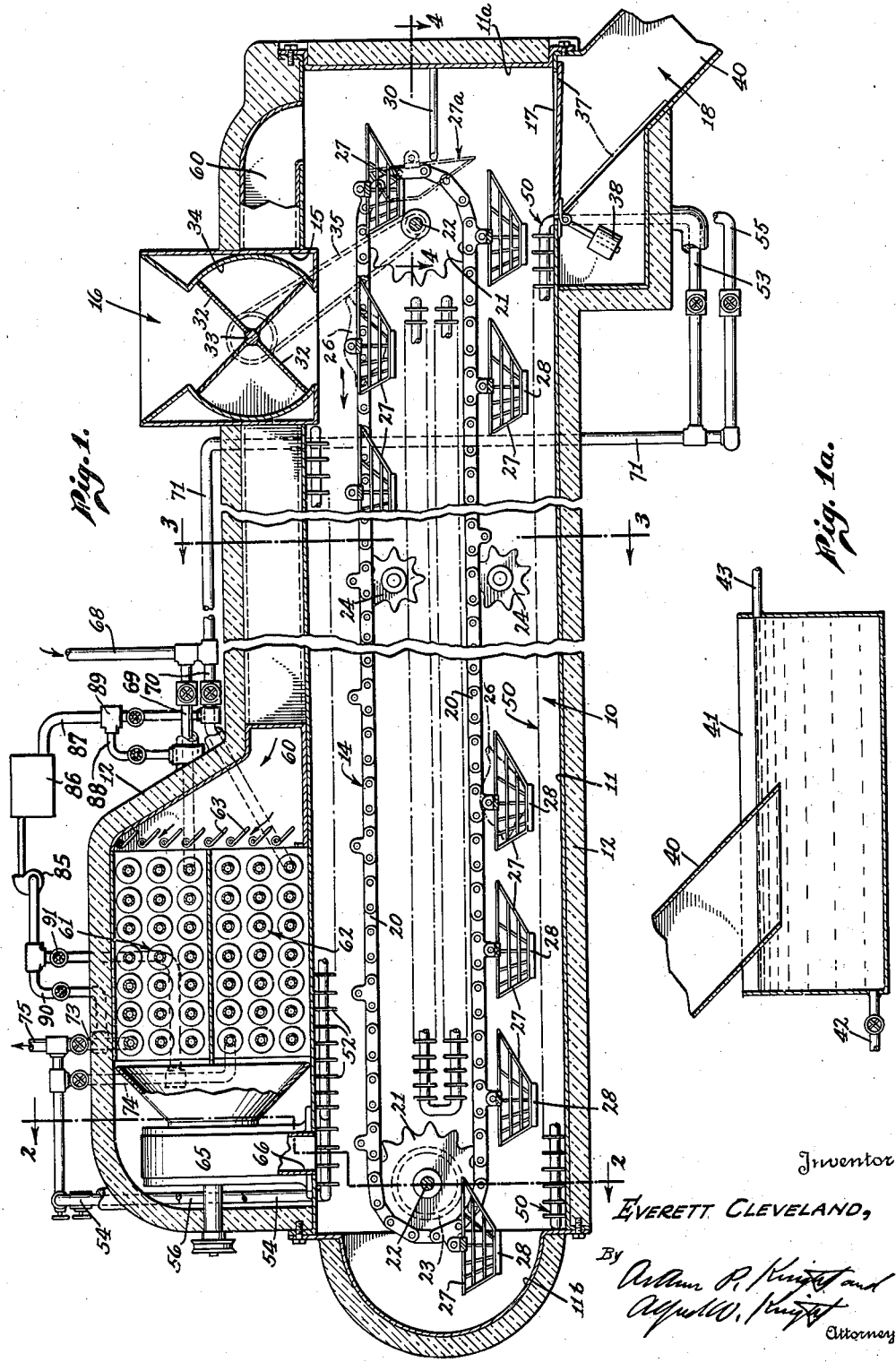
Inventor
EVERETT CLEVELAND,
By
Attorneys

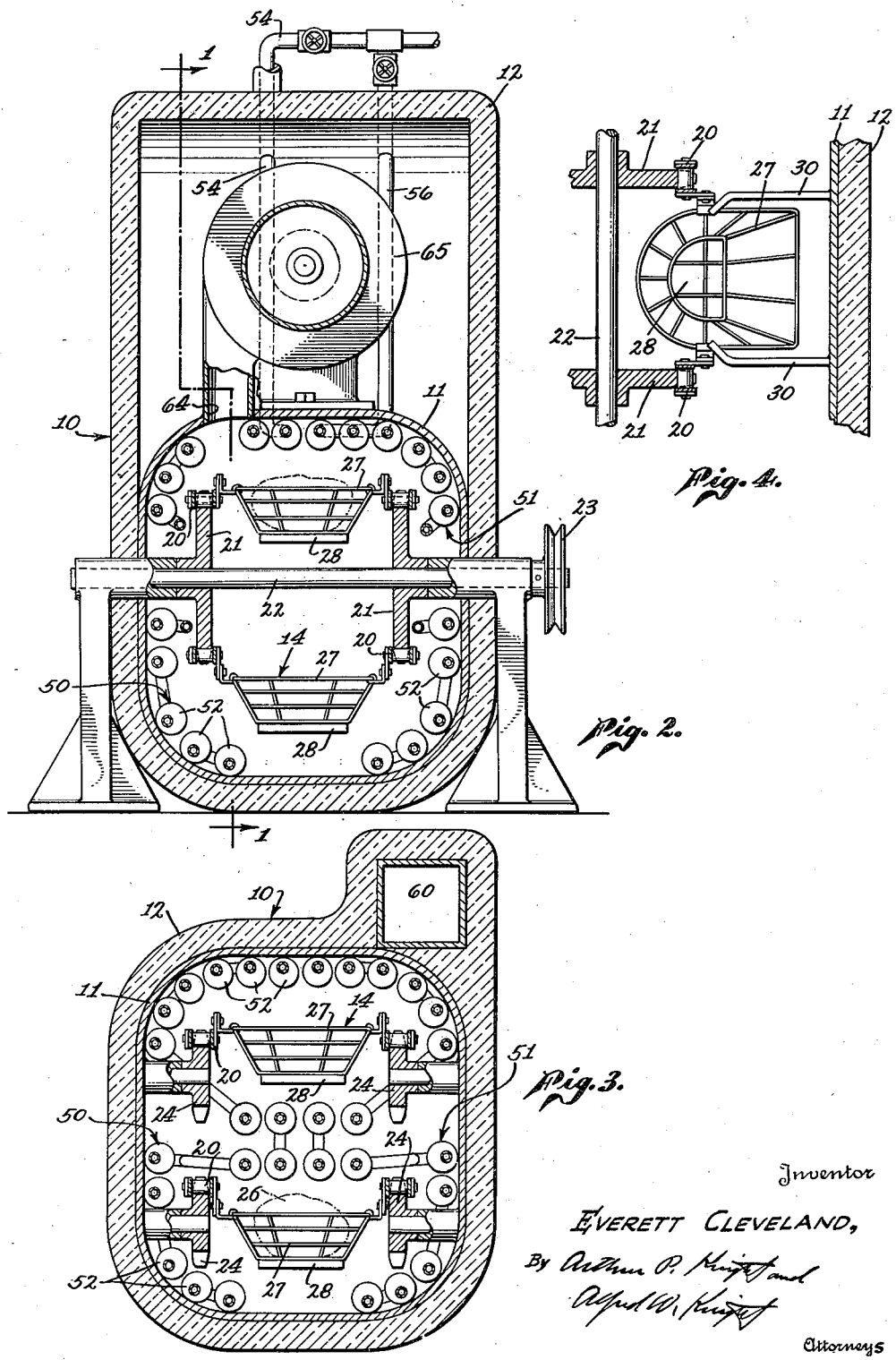

Inventor
EVERETT CLEVELAND,

Patented Sept. 2, 1941

2,254,420

UNITED STATES PATENT OFFICE 2,254,420

REFRIGERATING APPARATUS

Everett Cleveland, Salt Lake City, Utah, assignor of one-half to Arthur L. Layden, Los Angeles, Calif.

Application January 24, 1939, Serial No. 252,563

12 Claims. (Cl. 62—102)

This invention relates to the art of refrigeration, and more particularly to the quick freezing of articles. In the freezing of certain articles, such as the freezing of comestibles to preserve the same and permit storage or shipment thereof, or the freezing of animal or vegetable specimens to preserve the same for scientific research or other purposes, it is highly important that the refrigeration be conducted with sufficient rapidity to cause formation of ice crystals which are so small as not to rupture the cell walls or, in general, to accomplish the freezing so rapidly as to avoid any injurious or deleterious effect on the flavor or other natural quality of the article. It is this phase of refrigeration with which this invention is more particularly concerned, and the invention is generally applicable to articles which are subject to more or less rapid deterioration at temperatures above freezing and which are also subject to deterioration or degradation of quality if frozen by a relatively slow or prolonged refrigeration treatment.

The principal object of the invention, therefore, is to provide for an extremely rapid heat exchange between the articles to be frozen and the refrigerating medium. In this connection, it is a further object to provide a refrigerating apparatus or system which is simple and economical in construction and operation, and which is of high efficiency and capacity whereby a large number of articles may be frozen in a relatively short time and in an apparatus of relatively small size.

Another object is to provide a refrigerating apparatus having a closely confined freezing chamber which is effectively sealed from the surrounding atmosphere and insulated to minimize access of heat from outside the chamber, and in which the refrigerating walls through which heat is transferred from the articles to the refrigerant are disposed in close proximity to the articles, so as to provide a highly efficient heat transfer.

Another object is to provide a refrigerating apparatus having the above-mentioned characteristics, through which articles to be frozen may be passed continuously and discharged in frozen condition, or in which a relatively large number of articles can be placed at one time, subjected to freezing therein within a short time, and then removed.

Another object is to provide an apparatus or system in which the articles to be frozen are refrigerated by the combined action of a refrigerating medium circulated in heat-exchanging relation therewith through walls disposed in close proximity to the articles so as to effect rapid transfer of heat from the articles through such walls to the refrigerating medium, and of a stream of refrigerated gas circulated through the freezing chamber and in direct contact with the articles so as to effect transfer of heat from the articles also to such gas, which is preferably recirculated through the chamber and passed in heat-exchanging relation with refrigerating means outside the chamber in which the articles are disposed.

An additional object is to provide an apparatus adapted to glaze the articles after freezing with a thin coating of ice to aid in preserving the frozen articles.

These objects are attained in apparatus constructed according to my invention by providing an elongated freezing chamber, the interior of which is in heat-receiving relation with wall means defining a refrigerant expansion space, the heat transmitted to the wall being conducted through it to the cold refrigerant. This wall means may take the form of coils inside the chamber or a continuous jacket around the chamber. Means for introducing articles to be frozen at one point and means for removing frozen articles at a second spaced point are provided, both means being of the air-seal type to keep out warmer air as far as possible. Within the chamber is conveying means for moving the articles from the inlet to the outlet to permit continuous operation, the conveyor speed being timed to obtain the desired degree of freezing during travel. Any suitable conveyor may be used, such as belts, chains and baskets, vibratory conveyor, and the like, and the conveyor may be horizontal or inclined thereto with the chamber positioned accordingly.

A second cooling system is provided to cool and circulate a stream of gas through the chamber to make extraction of heat from the articles more rapid. The gas is usually air, and is cooled preferably by a pair of coils outside the freezing chamber and capable of independent operation in order that one coil may be defrosted while the other coil is cooling the gas stream, thus making for longer periods of uninterrupted operation. The plant for cooling and compressing refrigerant as well as the defrosting means may be of any conventional construction.

The apparatus shown and described herein is particularly adapted and designed for freezing turkeys, chickens, and the like, but it will be understood that I am not limited to any one type of food, and that various changes in the apparatus, especially the conveyor, may be made to accommodate various kinds of food materials.

How the above, as well as other objects and advantages not specifically mentioned, are attained will be more readily understood by reference to the following description and the annexed drawings, in which:

Fig. 1 is a longitudinal vertical section through a typical freezing apparatus constructed in accord with my invention, the section being taken on line 1—1 in Fig. 2;

Fig. 1a is a fragmentary vertical section showing the submerged lower end of the outlet chute from the freezing chamber, in continuation of the portion shown in Fig. 1;

Fig. 2 is a vertical transverse section through the freezing apparatus, taken on line 2—2 of Fig. 1;

Fig. 3 is a vertical transverse section through the freezing apparatus on line 3—3 of Fig. 1, with constructional features remote from the cutting plane omitted for the sake of simplicity;

Fig. 4 is a fragmentary horizontal section on line 4—4 of Fig. 1 showing means for tipping the baskets on the conveyor means;

Figure 5:
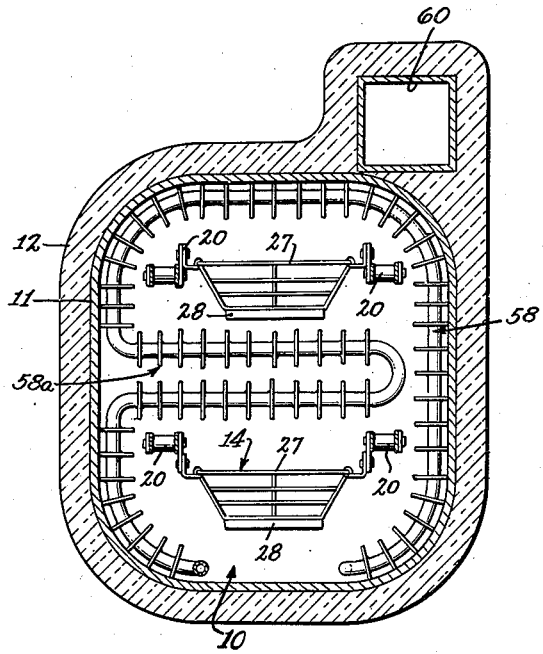
Fig. 5 is a vertical transverse section similar to Fig. 3 showing a variational arrangement of the cooling coils within the freezing chamber.

In a preferred form of my invention there is provided an elongated freezing chamber 10 inside a metal shell 11, around which is placed a layer of suitable insulating material 12 adapted to prevent access of heat to freezing chamber 10. The freezing chamber may be of any suitable size and shape as may be necessary to enclose a suitable conveying means, indicated generally at 14 and described in greater detail later. The cross-sectional size and shape of the freezing chamber, as illustrated in Fig. 3, is preferably such as to accommodate the conveying means with ample but not excessive clearance at all sides, while the same considerations dictate the length of chamber 10 as shown in Fig. 1. Because of these considerations, it is convenient to form shell 11 as a tubular member and to provide closure members 11a and 11b at each end of the tube, these end closure members being preferably removable in order to afford easy access to the interior of the freezing chamber.

Tubular shell 11 and chamber 10 need not be limited to a horizontal position, but may be inclined or vertical, suitable changes being made in the means for introducing and removing articles and conveying them through the freezing chamber.

A suitable article inlet opening 15 is provided at the upper side of shell 11 to accommodate means, generally indicated at 16, for introduction of articles to be frozen. The inlet 15 may be located at any desired position, but is preferably located near one end of chamber 10. At some second position spaced from the position of inlet 15, is an article outlet opening 17 in shell 11 which opens into means, generally indicated at 18, for removal of frozen articles from the chamber. Outlet 17 may be located at any desired position along shell 11, but is preferably near the same end as inlet 15.

Conveying means 14 is disposed within the freezing chamber in a position to receive and support articles introduced through inlet 15, and is adapted to move the articles so received within the chamber from location of inlet 15 to the position of outlet 17, at which latter point the frozen articles are then removed from the freezing chamber. This movement may involve carrying the articles through a greater or lesser portion of the length of chamber 10 as may be required to secure the desired amount of freezing, it being preferred to move the articles through a U-shaped path in order to secure a longer time within the freezing chamber without any increase in over-all dimensions of the refrigerating apparatus.

Conveying means 14 may take any desired form, such as an endless belt or belts, the construction here shown being illustrative only. More specifically, the conveyor shown comprises two laterally spaced endless chains 20 each running over a pair of sprockets 21 located one near each end of chamber 10. As may be seen from Fig. 2, the two sprockets 21 at each end of the chamber are mounted upon a shaft 22 journaled in bearings supported in walls 11 of the refrigerating chamber; and one of shafts 22 extends outwardly through walls 11 and insulation 12 in order that it may serve as a drive shaft for rotating sprockets 21 and moving chains 20, any suitable drive means being provided, as for example pulley 23 as illustrated in Fig. 2. At suitable intervals along chains 20, idler sprockets 24 are provided to support the upper and lower runs of the chains to prevent them from sagging too much. Idlers 24 are rotatably mounted in bearings supported on the walls of shell 11.

It will be noted that conveyor 14 is located wholly within the freezing chamber, although the drive means is outside and connected to the conveyor by a shaft 22. This arrangement effects heat economy since no parts of the conveyor are moved into a warm atmosphere and then back into the cold chamber, an arrangement that imposes a greater load on the cooling units and lessens the refrigerating efficiency of the apparatus as a whole.

At suitable equal intervals along conveyor 14, are located baskets 27 or other suitable receivers adapted to receive and hold an article to be frozen. A basket of the shape shown is especially suited to holding poultry and the like, indicated at 26. Each basket 27 is supported by and between the two chains 20 and is pivotally attached near the top at each of two opposite sides to one of these chains. Each basket is provided with a weight 28 on its under side that causes each basket to travel normally with its open side upward and to persist in that position even though the article received from loading means 16 is not exactly centered in the basket. Also the basket is not inverted or turned upside down as it passes downwardly around sprockets 21 at the left-hand end of the conveyor as viewed in Fig. 1. In this way the center of gravity of the baskets and their load is well below the point of support and the baskets are adapted to continuously retain an article to be frozen, whether traveling on the upper or lower run of the conveyor, until such time as the basket is deliberately tilted in order to dump its contents.

An arrangement for this latter purpose is illustrated in Figs. 1 and 4, and comprises a pair of fixed rods 30 projecting inwardly from the end wall 11a from a position in prolongation of conveyor 14. Rods 30 are preferably spaced apart a distance greater than the width of baskets 27 and have inwardly turned end portions adapted slidably to engage the top edges of the sides of basket 27 as it rises upwardly around sprocket 21 at the right-hand end of the conveyor as viewed in Fig. 1, and hold down the outer end of the pivotally mounted basket. Continued movement of the basket causes it to tilt in a clockwise direction into the position 27a illustrated by the dot-dash lines in Fig. 1. In this position, the basket's contents slide out of the basket and drop through outlet opening 17 which is located directly beneath the place at which the baskets are tilted. Each basket is carried on upwardly until it clears tipping bars 30, when it is restored by gravity to its normal position before it again passes under inlet opening 15 to receive another article to be frozen.

Since it is obviously desirable to prevent the warm air of the surrounding atmosphere from entering refrigerating chamber 10, both inlet 15 and outlet 17 are closed by some airtight means also adapted to permit passage therethrough of the articles frozen within the chamber. In the case of inlet 15, this air-seal means may also operate as means 16 for introducing the articles into the chamber interior. As typical of suitable mechanisms, there is shown a conventional type of air-seal valve comprising a plurality of angularly spaced vanes 32 attached to rotating shaft 33, the outer ends of vanes 32 being slidably engageable in air-tight relation with arcuate walls 34. Shaft 33 and vanes 32 are rotated by suitable means, as by chain 35 passing over sprockets attached to shaft 33 and one shaft 22, the rotation of the vanes being so timed that an article placed between two of them passes through the air-seal means 16 and is dropped into a basket 27 through inlet 15 as each basket passes in succession under the inlet. Automatic article introducing means of this character is preferred in order to permit continuous operation of the refrigerating apparatus, but it will be understood that it is within the scope of my invention to fill all the baskets on the conveyor, either mechanically or manually by removing end wall 11a and allowing the conveying means to remain stationary within the cooling chamber until such time as all the articles are frozen, thus operating the refrigerating apparatus by batches rather than continuously.

Regardless of the method of operation, the manner of removing the frozen articles may be the same. Outlet 17 is sealed normally against passage of air therethrough by a swinging door 37 pivotally mounted at one edge of the outlet opening and held normally in closed position by means of counterweight 38 adapted to rotate the door counterclockwise to the closed full line position shown in Fig. 1. The weight of a frozen article on top of the door is sufficient to overcome the influence of counterweight 38 and cause the door to rotate to the inclined dot-dash position illustrated in Fig. 1, in which position the frozen article slides off the door and down chute 40, which leads to any suitable container or conveying means as may be desired.

However, I prefer that chute 40 discharge the frozen article into tank 41 filled with water, the lower end of chute 40 being preferably below the water level in the tank in order to provide a liquid seal for chute 40 to prevent entrance of warm air into chamber 10 when door 37 is open. Water chilled to within a few degrees of the freezing point flows slowly through tank 41 by means of inlet and outlet pipes 42 and 43 respectively. The frozen article leaving chamber 10 has been cooled to a temperature below the freezing point of water and during a short period of immersion in the water within tank 41, a thin film of ice is formed over the exterior of the frozen body. In this way, frozen articles may be easily glazed following the freezing operation, and the coating of ice will persist provided the articles, immediately upon removal from tank 41, are stored in a sufficiently cool place. Tank 41 and the glazing process may obviously be omitted if desired.

Chamber 10 is cooled or refrigerated by two separate cooling systems. One of these cooling systems includes wall means defining a refrigerant expansion space which is in direct heat-exchanging relation to the interior of chamber 10 and which removes heat from the chamber that is received by the wall means by radiation, conduction, or convection, this cooling means being preferably placed as close to the articles to be frozen as is practical considering the necessary space allowed for the conveying means. The second cooling system comprises circulating and refrigerating means adapted to circulate a stream of chilled gas through chamber 10, this gas commonly being air, but it is also within the scope of my invention to use any suitable chemically inert gas. This gas is referred to as air herein because that is a typical and commonly used gas, but my invention is not to be construed as limited thereto.

Considering now in detail the first of these cooling systems, I provide within shell 11 suitable wall means defining a refrigerant expansion chamber within shell 11 and in direct heat-receiving or heat-exchanging relation with freezing chamber 10. A preferred example of such wall means is the cooling coils 50 and 51 illustrated in Figs. 1 to 3. Each coil 50 and 51 comprises a pipe, the walls of which enclose and define the refrigerant expansion space, the pipe being bent as may be desired to conform to the interior of shell 11 and to locate the cooling coil at desired points. Sheet metal fins 52 are attached to the pipes at intervals to facilitate absorption of heat by the coils. Of course, other shapes and conformations of the coils may be used if desired, and the two coils 50 and 51 may be combined into a single coil, but such changes in the locations of the elements of the coils are within the contemplation of my invention. The formation of coil 50 illustrated in Figs. 1, 2, and 3 is typical and illustrates how the coil is located within chamber 10 to be in direct heat-exchanging relation with the chamber interior and to be as close as practical to the path of the articles carried in baskets 27 in order to make for a rapid and efficient absorption by the coil of heat given off by the articles during the freezing process.

Referring particularly to Figs. 1 and 3, coil 50 may be considered as commencing where inlet pipe 53 enters shell 11 through the bottom wall near the right-hand end of Fig. 1. Three straight longitudinally-extending runs of the coil are closely spaced from one another and lie against the lower corner of shell 11. In order to avoid interference with the bearings for sprockets 24, the next two runs of coil 50 are removed vertically a short distance from the first three runs mentioned, to the position shown in Fig. 3 above the bearings and lie against the vertical side wall of the chamber. The coil is next led into the space between the upper and lower runs of conveyor 14, and in this space coil 50 has four longitudinally extending runs, being the two lower and two upper lengths of the pipe illustrated to the left of the center line in Fig. 3, it being understood that these runs of the coil are somewhat shorter than those first described since they lie between the two sprockets 21 at each end of the conveyor. Finally, coil 50 comprises six longitudinally extending elements located at the upper corner and along the top wall of chamber 10, these runs of the coil extending only to inlet opening 15, as shown in Fig. 1, and certain of the runs being shortened, as shown in Fig. 2, to avoid interference with the inlet 66 of the air-circulating system. Coil 50 is connected to outlet pipe 54 entering the chamber 10 through the top wall of shell 11.

Coils 50 and 51 are substantially symmetrical about the vertical center line of the refrigerating apparatus, as may be seen in Fig. 3, the elements of coil 51 being located in the same general manner as previously described. It will be understood, of course, that the various runs or elements of the coils described are connected by suitable bends or loops in the pipe in order that each coil is continuous from its point of entry to its point of exit. Coil 51 is connected to inlet pipe 55 at the bottom of the shell, and also to outlet pipe 56 at the top of the shell as shown in Fig. 2.

An example of another shape of the cooling coils within shell 11 is illustrated in Fig. 5, in which coils 58 of the same general character are formed with transversely extending loops or runs having the general outline shown in that figure. These transversely extending loops are so spaced as not to interfere with the bearings of sprockets 21 or idlers 24, and are changed in shape at the ends of chamber 10 by omitting the U-shaped section 58a that extends horizontally between the two lengths of conveyor 14. Any suitable number of the transverse runs may be grouped together to form a single coil extending between an inlet and an outlet pipe, not shown, but similar to inlets 53 and 55 and outlets 54 and 56.

The second system for refrigerating the interior of chamber 10 comprises gas cooling and circulating means located outside shell 11 but preferably all enclosed within the external layer 12 of insulating material in order to heat-insulate the entire system. This system comprises air duct 60 disposed above shell 11 and opening into chamber 10 at one end of the refrigerating apparatus, preferably the end adjacent article inlet 15. Air duct 60 runs longitudinally of the refrigerating apparatus toward the other end thereof, near which the duct is enlarged to accommodate one or more cooling coils 61 and 62, the air stream being directed into these cooling coils by a series of pivotally mounted vanes 63.

Coils 61 and 62 are separated by a partition and the vanes 63 at the entrance end of each coil are movable as a unit (mechanism not shown) to shut off air flow past either coil as may be selected, or permit flow past both coils. At the opposite side of cooling coils 61 and 62 from vanes 63, is located some air-circulating means, such as blower 65, which is adapted to draw the chilled air through the cooling coils and force it into chamber 10 through cold air inlet 66. The air thus chilled then flows longitudinally of chamber 10 in a direction opposite to the motion of the upper run of conveyor 14, and during this passage absorbs heat from the articles as they are frozen. The air stream with its added heat content is then circulated through duct 60 and this heat removed by passing through coils 61 and 62. The air stream may be circulated in the opposite direction if desired.

Although a single coil 61 may be used, it is preferred to provide two coils as one of them may then be shut off for defrosting purposes without interfering with the cooling of the air stream, thus making operation of the refrigerating apparatus continuous. No specific means is shown for defrosting any of the cooling coils 50, 51, 61, or 62, as any conventional means may be used and several are well known to those skilled in the art.

No plant or equipment is shown for compressing and cooling the refrigerant, since this apparatus may be of any conventional type and is well known to those skilled in the art. It is contemplated that any of the more easily liquified gaseous refrigerants, such as ammonia, carbon dioxide, methyl chloride, "Freon" (dichlorodifluoromethane), or the like, may be used and the nature of the auxiliary equipment used to cool and compress this refrigerant will vary with many factors, such as the type of refrigerant, the refrigerating load, and the like. Compressed refrigerant is supplied through main pipe line 68 and goes to coils 61 and 62 through branch lines 69 and 70 respectively, while branch 71 supplies refrigerant to inlet pipes 53 and 55 which are connected to coils 50 and 51 respectively. The expanded refrigerant leaves coils 50 and 51 through branch outlet pipes 54 and 56 respectively, and leaves coils 61 and 62 through branch outlet pipes 73 and 74 respectively. These branch outlet pipes all connect to main return line 75 which feeds the expanded refrigerant back to the compressor unit, not shown. All the branch lines are controlled by one or more valves as shown, in order that the flow of refrigerant may be confined to any number of coils less than the entire number. The valves in the inlet branches are preferably of a combined expansion and shut-off type, while the valves in the outlet branches are shut-off valves. Other piping systems may be used, if desired, as when refrigerant is supplied to coils 61 and 62 from a different source than supplies coils 50 and 51. The pipe lines are ordinarily covered with insulating material when they are outside of the insulation 12, but in the drawings the insulation is shown broken away.

Figure 6:
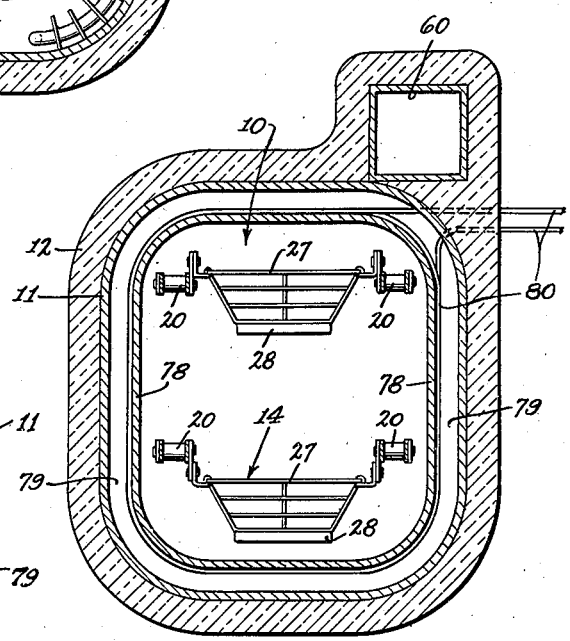
Fig. 6 is a vertical transverse section similar to Fig. 3 showing a variational construction in which the cooling coils have been replaced by a continuous jacket.

A variational form of the invention is illustrated in Fig. 6 which is substantially the same as the forms so far described, except that there is provided within shell 11 a second or inner shell 78. With this construction, the two shells 11 and 78 form double-walled wall means which define and enclose between them a refrigerant expansion chamber 79 which is in heat-exchanging relation with the interior of refrigerating chamber 10, thus replacing coils 50 and 51 with a continuous jacket around the freezing chamber. With this construction, one of branch refrigerant lines 53 and 55 is dispensed with, while the other connects directly with the expansion chamber 79 between walls 11 and 78. Likewise, one of outlets 54 and 56 is eliminated, while the other is connected directly to the expansion chamber for returning expanded refrigerant to the compressor, not shown. The size of shell 78 is preferably as small as possible and still leave ample room for clearance of articles carried on conveyor 14, in order that the wall means is sufficiently close to the articles to effect a rapid and thorough transfer of heat from the articles and the refrigerating space through the wall to the expansion chamber.

It will be appreciated that all or part of the various coils 50 and 51 of Figs. 1 and 3 or coils 58 of Fig. 5 may be used in conjunction with and in addition to the double-walled or jacketed construction of Fig. 6. A combination of this character includes both types of wall means for defining two or more refrigerant expansion spaces in heat-receiving relation with respect to the chamber interior.

Figure 7:
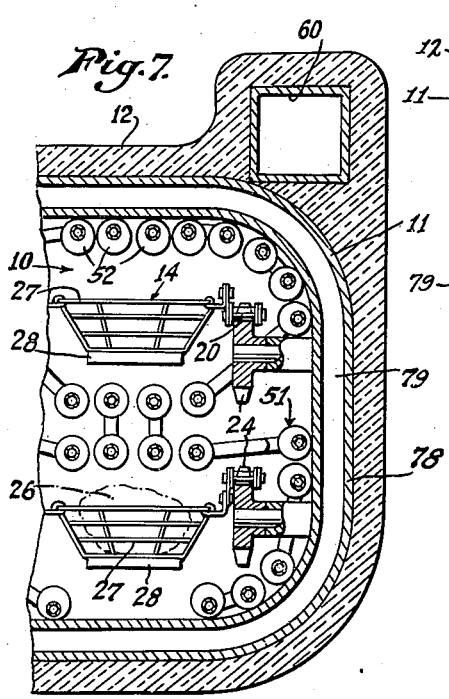
Fig. 7 is a fragmentary vertical transverse section similar to Fig. 3 showing a variational construction in which both cooling coils and a continuous jacket are employed.

Fig. 7 shows an example of this latter embodiment in which cooling coils 50 and 51 are placed within the elongated chamber and arranged as described in conjunction with Figs. 1-4; and the two shells 11 and 78 form a double-walled wall means that enclose between them a refrigerant expansion space 79 around the chamber, as described in conjunction with Fig. 6. There are thus two expansion spaces, one formed by coils 50 and 51 and one by shells 78 and 11, and both spaces are in heat-exchanging relation to the chamber interior.

Any suitable means may be provided and used for defrosting the refrigerating elements in any of the above-described forms of the invention, numerous conventional methods and means for this purpose being well known in the art. In the form of apparatus shown in Fig. 6 I may provide electrically insulated electric heating element 80 which is shown wrapped around the shell 78 and within chamber 79, in thermal contact with but electrically insulated from shell 78. The shell 78 can thus be defrosted by passing current from any suitable source through heating element 80, and this method of defrosting can be used either alone or in conjunction with any other defrosting means.

The method of operation of my improved refrigerating apparatus will now be described briefly. Compressed refrigerant is supplied through main line 68 from a suitable source and is expanded through the valves in the branch inlet lines into cooling coils 50 and 51 within chamber 10 in the form of Figs. 1-3. If the forms of Figs. 5 or 6 are used, the refrigerant is expanded into coils 58 or chamber 79, or any combination of these elements used. In any of these forms, refrigerant is also supplied to cooling coils 61 and 62 in air duct 60. After the freezing chamber has reached a suitably low temperature, the articles to be frozen are automatically introduced into the chamber by the valve means indicated at 16, which is driven in synchronism with conveyor 14 so that an article is placed on each of baskets 27 as it passes beneath inlet 15. The rate of travel of conveyor 14 is timed in accordance with the freezing chamber temperature, size of the articles to be frozen, and the length of conveyor 14, to obtain the desired degree of freezing by the time the article has been conveyed from inlet 15 to a position above outlet 17 through which the frozen article passes after it has been dumped from the basket by tipping bars 30. The frozen article may be delivered by chute 40 onto a platform or other conveyor if desired, although I prefer to glaze the article in tank 41.

A portion of the heat from the articles carried by conveyor 14 reaches the walls of coils 50 and 51, or of coils 58, or wall 78 of space 79 as the case may be, by radiation or convection and is transmitted through the walls to the expanded refrigerant within the space defined by the walls. The remainder of the heat from the articles is taken up by the stream of chilled air circulated through chamber 10 and cooled by coils 61 and 62. It is preferred that coils 61 and 62 be maintained at a somewhat lower temperature than the interior of chamber 10 as this tends to retard formation of frost on the coils within the freezing chamber and increases the tendency of frost to form instead on coils 61 and 62. The amount of frost accumulated on the coils depends upon the moisture given off by the articles during the freezing process, and may in some cases be negligible. It is preferred that the moisture be condensed upon coils externally of chamber 10, as these coils may be defrosted more easily without interrupting the continuous operation of the apparatus. When defrosting is necessary, vanes 63 at the entrance to one coil are closed and refrigerant supply to the coil is shut off by the valves in the pipe lines while that coil is defrosted by any suitable conventional method, the other coil remaining in operation to cool air within duct 60. As typical of conventional defrosting means and methods, there is shown in Fig. 1 means for circulating heated refrigerant through coils 61 and 62 to defrost each of the coils individually. This defrosting system includes a fluid pump 85, a heater 86, a supply line 87 conveying heated refrigerant to coils 61 and 62 through valve controlled branches 88 and 89 connected respectively to pipes 69 and 70. After passing through the coils, the refrigerant is removed by valve controlled branch lines 90 and 91 connected respectively to pipes 73 and 74, and returned by pipe 92 to pump 85. To defrost coil 61, the upper vanes 63 are closed, the valves in lines 69 and 73 of the chilled refrigerant are closed, and the valves in branch lines 88 and 90 are opened. The refrigerant is circulated through the coil and heater 86 until the desired amount of defrosting is accomplished, when the valve positions are restored to normal to shut off the defrosting system and again circulate refrigerant for cooling the coils. After the first coil is defrosted, it is then placed in operation as a cooling coil by opening vanes 63 and restoring the refrigerant supply, while the second coil is defrosted. The cooling coils within chamber 10 or shell 78 may be defrosted at required intervals by any conventional method, it being necessary during this operation to discontinue the freezing operation.

The freezing apparatus may be operated by the batch method by removing an end closure, as for example end wall 11a, and fully loading conveyor 14 by hand through the open end of shell 11. The conveyor then remains stationary for the time required to freeze the contents of the chamber, after which time the articles may be removed automatically through outlet 17 in the manner previously described by operating the conveyor, or they may be removed manually through the opened end of the freezing chamber.

Having described a preferred form of my invention and certain modifications thereof, it will be understood that various changes in arrangement and construction may be made without departing from the spirit and scope of my invention. Therefore, the foregoing description is to be considered as illustrative of, rather than limitative upon, the appended claims.

I claim:

1. In a refrigerating apparatus, the combination of an elongated chamber; means for introduction of articles to be frozen into said chamber at one position; conveying means disposed within said chamber to receive and support articles introduced at said one position and operable to move such articles longitudinally throughout substantially the entire length of the chamber; a refrigerant expansion coil disposed within and extending throughout substantially the entire length of the chamber and in close proximity to the wall of the chamber and to articles on said conveying means; a separate refrigerant expansion coil located outside the chamber; means for supplying expansible refrigerant to both said expansion coils; and means for circulating a stream of gas through said chamber in intimate contact with articles on said conveying means, and exteriorly of said chamber in contact with the last-mentioned expansion coil.

2. In a refrigerating apparatus, the combination of a horizontally elongated chamber; a conveyor disposed wholly within said chamber and operable to move articles delivered thereto longitudinally through substantially the entire length of the chamber; article feeding means operatively associated with said conveyor to deliver articles into said chamber and to said conveyor at one position; means to discharge articles from said conveyor and from the chamber at a position removed from said one position along the path of movement of articles on said conveyor; a refrigerant expansion coil disposed within and extending throughout substantially the entire length of the chamber and in close proximity to the wall of the chamber and to articles on said conveying means; a separate refrigerant expansion coil located outside the chamber; means for supplying expansible refrigerant to both of expansion coils; and means for circulating a stream of gas through said chamber in intimate contact with articles on said conveying means, and exteriorly of said chamber in contact with the last-mentioned expansion coil.

3. In a refrigerating apparatus, the combination of a horizontally elongated chamber; an endless conveyor disposed wholly within said chamber and comprising an upper run moving from adjacent one end to adjacent the other end and a lower run moving in the reverse direction, said conveyor being operable to move articles delivered thereto at a position adjacent said one end along the upper run and then back along the lower run to another position also adjacent said one end; article feeding means operatively associated with said conveyor to deliver articles into said chamber and to said conveyor at the first-mentioned position; means to discharge articles from said conveyor and from the chamber at said other position; wall means defining a refrigerant expansion space in heat-exchanging relation to the interior of said chamber, said wall means being disposed in close proximity to articles on said conveying means and separating said expansion space from the interior of the chamber and serving to conduct heat from the chamber interior to said space; separate refrigerating means located outside said chamber and comprising a refrigerant expansion coil; means for supplying expansible refrigerant to said expansion space and to said expansion coil; and means for circulating a stream of gas through said chamber in intimate contact with articles on said conveying means, and through said separate refrigerating means in intimate contact with said expansion coil.

4. In a refrigerating apparatus, the combination of a horizontally elongated chamber; an endless conveyor disposed wholly within said chamber and comprising an upper run moving from adjacent one end to adjacent the other end and a lower run moving in the reverse direction, said conveyor being operable to move articles delivered thereto at a position adjacent said one end along the upper run and then back along the lower run to another position also adjacent said one end; article feeding means operatively associated with said conveyor to deliver articles into said chamber and to said conveyor at the first-mentioned position; means to discharge articles from said conveyor and from the chamber at said other position; a refrigerant expansion coil disposed within and extending throughout substantially the entire length of the chamber and in close proximity to the wall of the chamber and to articles on said conveying means; a separate refrigerant expansion coil located outside the chamber; means for supplying expansible refrigerant to both of expansion coils; and means for circulating a stream of gas through said chamber in intimate contact with articles on said conveying means, and exteriorly of said chamber in contact with the last-mentioned expansion coil.

5. In a refrigerating apparatus, the combination of an elongated chamber; means for introducing articles to be frozen into said chamber at one position; means at a second position spaced from said one position for removing frozen articles from the chamber; conveying means within said chamber adapted to receive and support articles introduced at said one position and operable to convey the articles to said second position for removal from the chamber; wall means defining a refrigerant expansion space in heat-exchanging relation to the interior of said chamber; separate refrigerating means located outside said chamber and comprising a pair of refrigerant expansion coils; means for supplying refrigerant to said expansion space and independently to each of said coils; means to defrost each of said coils individually; means for circulating a stream of gas through said chamber in intimate contact with articles on said conveying means and past said separate coils in intimate contact therewith; and means associated with the coils to direct the gas stream into contact with only one coil when the other one is being defrosted.

6. In a refrigerating apparatus, the combination of a horizontally elongated chamber having removable closure means at one end; an endless conveyor disposed wholly within said chamber and comprising an upper run moving from adjacent said one end to adjacent the other end and a lower run moving in the reverse direction, said conveyor being operable to move articles delivered thereto at a position adjacent said one end along the upper run and then back along the lower run to a position adjacent said one end; wall means defining a refrigerant expansion space in heat-exchanging relation to the interior of said chamber, said wall means being disposed in close proximity to articles on said conveying means and separating said expansion space from the interior of the chamber and serving to conduct heat from the chamber interior to said space; separate refrigerating means located outside said chamber and comprising a refrigerant expansion coil; means for supplying expansible refrigerant to said expansion space and to said expansion coil; and means for circulating a stream of gas through said chamber in intimate contact with articles on said conveying means, and through said separate refrigerating means in intimate contact with said expansion coil.

7. In a refrigerating apparatus, the combination of a horizontally elongated chamber having removable closure means at one end; an endless conveyor disposed wholly within said chamber and comprising an upper run moving from adjacent said one end to adjacent the other end and a lower run moving in the reverse direction, said conveyor being operable to move articles delivered thereto at a position adjacent said one end along the upper run and then back along the lower run to a position adjacent said one end; a refrigerant expansion coil disposed within and extending throughout substantially the entire length of the chamber and in close proximity to the wall of the chamber and to articles on said conveying means; a separate refrigerant expansion coil located outside the chamber; means for supplying expansible refrigerant to both of said expansion coils; and means for circulating a stream of gas through said chamber in intimate contact with articles on said conveying means, and exteriorly of said chamber in contact with the last-mentioned expansion coil.

8. In a refrigerating apparatus, the combination of an elongated chamber; means for introducing articles to be frozen into said chamber at one position; means at a second position spaced from said one position for removing frozen articles from the chamber, said means comprising a pivoted door normally held closed but adapted to swing to an open position under the influence of gravity when an article is deposited thereon, a chute beneath said door, and a liquid body submerging the lower open end of the chute to seal the chute against entry of surrounding atmospheric air; conveying means within said chamber adapted to receive and support articles introduced at said one position and operable to convey the articles to said second position for removal from the chamber; wall means defining a refrigerant expansion space in heat-exchanging relation to the interior of said chamber; and means for supplying expansible refrigerant to said expansion space.

9. In a refrigerating apparatus, the combination of an elongated chamber; means for introducing articles to be frozen into said chamber at one position; means at a second position spaced from said one position for removing frozen articles from the chamber; conveying means within said chamber adapted to receive and support articles introduced at said one position and operable to convey the articles to said second position for removal from the chamber; wall means defining a refrigerant expansion space in heat-exchanging relation to the interior of said chamber; separate refrigerating means located outside said chamber and comprising a refrigerant expansion coil; means for supplying expansible refrigerant to said expansion space and to said expansion coil; means for circulating a stream of gas in a closed circuit through said chamber in intimate contact with articles on said conveying means, and through said separate refrigerating means in intimate contact with said expansion coil; and an electric heating element in engagement with said wall means and inside said refrigerant expansion space for defrosting said wall means of frost accumulated within the elongated chamber.

10. In a refrigerating apparatus, the combination of an elongated chamber; means for introducing articles to be frozen into said chamber at one position; means at a second position spaced from said one position for removing frozen articles from the chamber; conveying means within said chamber adapted to receive and support articles introduced at said one position and operable to convey the articles to said second position for removal from the chamber; double-walled wall means defining a refrigerant expansion space around said chamber and in heat-exchanging relation to the interior of said chamber; a second wall means within the chamber defining a second refrigerant expansion space in heat-exchanging relation to the interior of said chamber; separate refrigerating means located outside said chamber and comprising a refrigerant expansion coil; means for supplying expansible refrigerant to both said expansion spaces and to said expansion coil; and means for circulating a stream of gas in a closed circuit through said chamber in intimate contact with articles on said conveying means, and through said separate refrigerating means in intimate contact with said expansion coil.

11. In a refrigerating apparatus, the combination of a horizontally elongated chamber; refrigerating means associated with said chamber adapted to freeze articles within the chamber; an endless conveyor disposed wholly within said chamber and comprising an upper run moving from adjacent one end of the chamber to adjacent the other end of the chamber and a lower run moving in the reverse direction, said conveyor being operable to move articles delivered thereto at a position adjacent said one end along the upper run and then back along the lower run to a second position adjacent said one end; means for introducing articles to be frozen into said chamber at said one end thereof and onto the upper run of the conveyor, said article introducing means including drive means actuating the introducing means in synchronism with the conveyor; and means located at said one end of the chamber for receiving frozen articles from the conveyor and automatically removing them from the chamber.

12. In a refrigerating apparatus, the combination of a horizontally elongated chamber; refrigerating means associated with said chamber adapted to freeze articles within the chamber; an endless conveyor disposed wholly within said chamber and comprising an upper run moving from adjacent one end of the chamber to adjacent the other end of the chamber and a lower run moving in the reverse direction, said conveyor being operable to move articles delivered thereto at a position adjacent said one end along the upper run and then back along the lower run to a second position adjacent said one end, said conveying means comprising a pair of longitudinally movable, laterally spaced endless members and a plurality of article receivers pivotally mounted on and between said endless members at a position above the center of gravity of the receiver both empty and loaded; means for introducing articles to be frozen into said chamber at said one end thereof and onto the upper run of the conveyor, said article introducing means including drive means actuating the introducing means in synchronism with the conveyor; means located at said one end of the chamber for receiving frozen articles from the conveyor and automatically removing them from the chamber; and means to remove a frozen article from a receiver comprising a fixed stop adapted to engage the top edge of the receiver and cause the receiver to rotate about its pivot as the conveyor moves the receiver past the fixed stop.

EVERETT CLEVELAND.